INVENTOR.
John M. Morgan, Jr.

United States Patent Office 3,474,216
Patented Oct. 21, 1969

3,474,216
PROCESS EFFICIENCY DETECTING CIRCUIT FOR ELECTRICAL DISCHARGE MACHINING APPARATUS
John M. Morgan, Jr., Cincinnati, Ohio, assignor to The Cincinnati Milling Machine Co., Cincinnati, Ohio, a corporation of Ohio
Filed Oct. 19, 1967, Ser. No. 676,473
Int. Cl. B23k 9/16, 9/10, 11/24
U.S. Cl. 219—69                                8 Claims

ABSTRACT OF THE DISCLOSURE

An apparatus for electrical discharge machining having a comparing circuit which determines the efficiency of the machining sparks by comparing the number of gap power input pulses with the number of good machining discharges produced thereby over a predetermined time interval and which provides a visual display of the efficiency as a percentage figure.

SUMMARY OF INVENTION

In its preferred form this invention is included in combination with a high frequency and high energy direct current pulsed power supply in an electrical discharge machining apparatus. It includes a quality testing interface circuit connected to the tool electrode at the machining gap to obtain feedback of discharge information which is compared with a preset standard to determine its quality. A circuit is provided in which the feedback discharge information is compared against a predetermined number of gap power input signals in succession. This comparison of the number of resulting good machining pulses produced in the gap by the predetermined number of gap input pulse commands yields a ratio of the spark efficiency. The circuit apparatus provides the ratio as a percentage value and displays this as an efficiency rating for the operator's convenience. This circuit also provides the means for up-dating the efficiency rating periodically and systematically while the machining apparatus is in operation. By knowing this efficiency rating, the machine operator can make adjustment of variables to operate the apparatus with improved machining performance.

THE DRAWINGS

DETAILED DESCRIPTION

Figure 1:
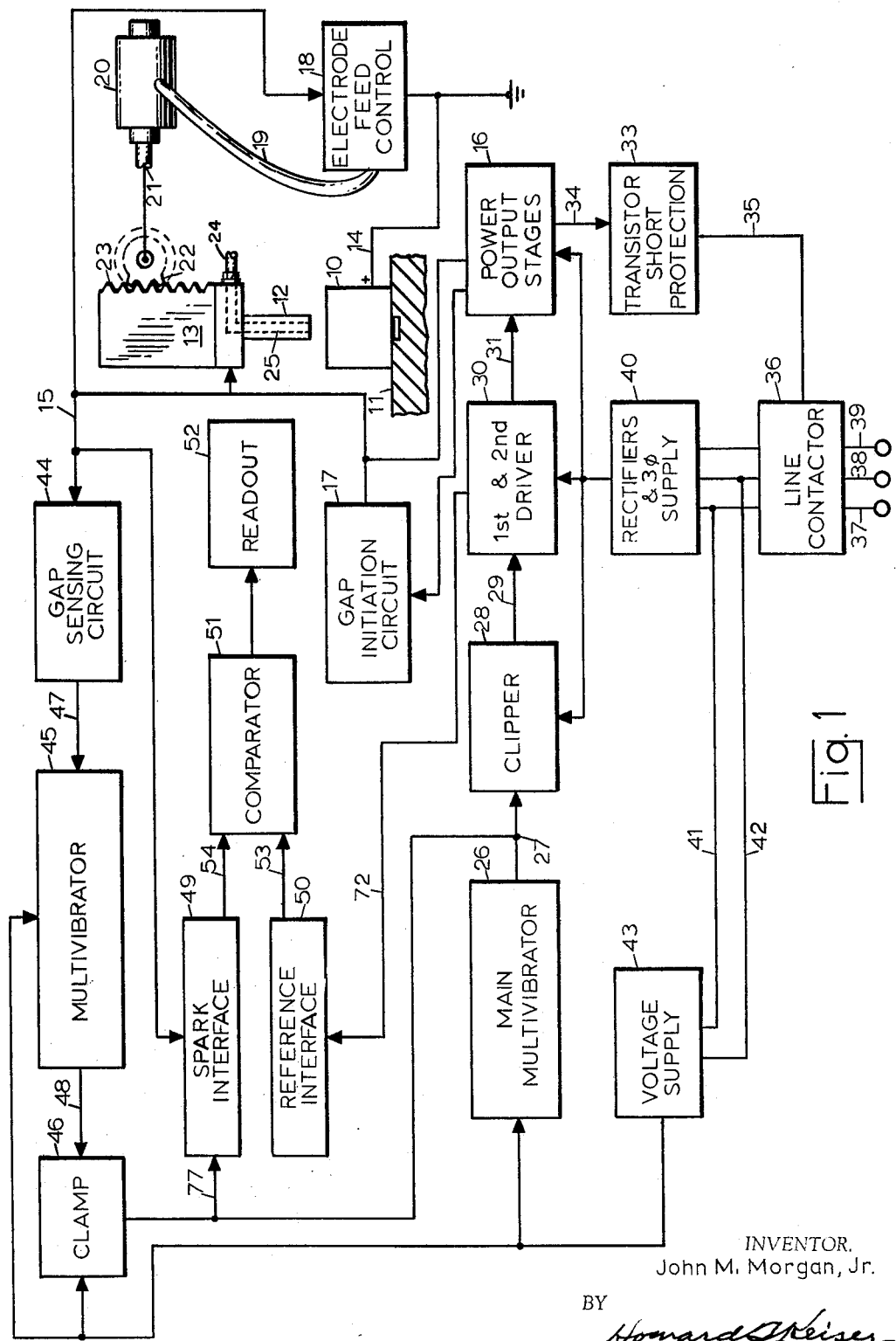
FIG. 1 is a block diagram of the power supply circuit for an electrical discharge machining apparatus incorporating the present invention, the mechanical portions of the machine being shown in simplified form with the block electrical diagram.

This invention is described in combination with the electrical discharge machining (EDM) apparatus illustrated by the block diagram and simplified mechanism of FIG. 1. The apparatus is intended to machine a workpiece 10 that is supported on a machine base 11 and which includes a tool electrode 12 attached to a ram 13 electrically insulated from the base 11. The ram 13 is movable toward and away from the base 11 to move the electrode 12 to and from the workpiece 10 which also acts as an electrode in the electrical circuit. As shown, the workpiece 10 is connected to ground or common potential by a conductive cable 14 while the electrode 12 is connected by means of a conductor 15 to a power output circuit 16 and a gap initiation circuit 17 which together output high energy negative direct current pulses at a high frequency. Thus, the tool electrode 12 is cathodic with respect to the anodic work 10 and when the two are brought into close proximity, sparks result and metal is removed from the workpiece 10 in the well-known manner of the EDM process.

The feed rate, that is the velocity of movement of the tool electrode through the workpiece 10, is under control of a conventional feed control circuit 18 that monitors the voltage across the machining gap between the tool electrode 12 and the workpiece 10. The feed circuit operates in accordance with the principles of servo mechanisms to maintain a constant average voltage across the gap and when this voltage drops toward zero potential, as when a direct short circuit occurs, the feed direction is reversed to withdraw the tool electrode 12 away from the workpiece 10. This will cause the average potential to rise and then with the potential rise, the tool is restarted toward the work. The feed control circuit 18 is connected by a cable 19 to a reversible feed motor 20 that drives the ram 13 up or down through a mechanical connection 21 terminating at a pinion 22 and a rack 23 formed on the ram 13.

The process is normally carried out in a dielectric medium such as oil. Therefore, a hose 24 is shown connected to the electrode 12 to supply the dielectric fluid under pressure to a central passage 25 through the electrode 12 from which it is discharged into the machine gap.

The frequency of the direct current pulses for the machining operation is controlled by a free-running multivibrator circuit 26 that outputs a series of pulses over a conductor 27 leading to a clipping circuit 28. The clipping circuit 28 is controlled by the multivibrator 26 and provides a series of pulses to an output line 29, each pulse of the series having a very fast rise time as a result of the clipping action. These pulses are passed over the line 29 to the driver stages 30 where they are amplified and subsequently applied over a conductor 31 to the output stage 16 which is the group of parallel current amplifiers supplying direct current pulses to the line 15 at a high power level and at a frequency determined by the frequency of the free-running multivibrator 26. These power pulses from the output stage 16 in this specific example are of negative polarity for use in the spark machining process.

The performance of the output stage is monitored by a short protection circuit 33 to which a voltage level output signal is connected by a conductor 34. When this voltage output does not return to zero within a predetermined time, a signal is applied over a line 35 to a line contactor unit 36 that disconnects the three-phase power input lines 37, 38, 39 from the direct current voltage supply unit 40. It also disconnects the single phase connection via lines 41, 42 from a second direct current power supply 43. When the line contactor unit is operated to open the lines 37–39, the entire power supply circuitry is deenergized and cannot be reenergized except manually.

The servo feed system described tends to operate in a manner to provide protection against short circuiting of the tool electrode 12 and the work 10 since it operates in an inverse relationship with the gap voltage. When a tool work short occurs, the voltage therebetween drops to a very low level and therefore the servo mechanism will begin to withdraw the tool electrode 25. The servo feed system will be too slow normally to react in case of a short circuit to pull the electrode back from the work 10 in time to protect it against catastrophic damage to elements in the process. Additional safety circuitry is required in the system which is much faster in operation than the line contactor 36 or the feed control circuitry 18 and the mechanism 20–23. This additional circuitry is provided by three sections of circuitry including a gap sensing circuit 44, a multivibrator 45 and a clamping circuit 46. It is the function of these circuits to test the quality of machining discharges at the gap and to turn off the pulsed electrical power to the gap temporarily if the quality is not up to the desired standard. Since many bad pulses are the result of temporary short circuit conditions, the protective circuits herein permit a preset number of bad discharges in succession before acting to turn off the power temporarily.

The feedback of each discharge voltage signal is applied from the line 15 to the gap sensing circuit 44 which tests the discharge quality. The gap sensing circuit 44 produces an output on line 47 whenever the gap voltage reaches a preset level which is indicative of a good discharge. A short at the gap will prevent the voltage from reaching this level and therefore the output is absent. When there is an output on the line 47, it resets the conventional multivibrator 45. This prevents the output 48 of the multivibrator 45 and the main multivibrator 26 continues to send a signal to the clipper 28. When the output 47 is absent, the multivibrator 45 is not reset and this produces an output on the line 48. The clamp circuit 46 fixes the output signal on line 48 at a preset value and feeds the signal to line 27 which is the output of the main multivibrator 26. This is an output suppression signal which is used to inhibit the output from the clipper circuit 28. Therefore, no pulses from the main multivibrator are passed through the circuit 28 and to succeeding circuits, thus turning off power to the gap.

Since the frequency of machining pulses is higher than the operating frequency of the multivibrator 45, a plurality of bad discharges in succession must be sensed before the multivibrator 45 is set. When this occurs, the power is caused to be interrupted for a plurality of control pulse periods, the frequency of these control pulses corresponding to the frequency of the control pulses from the main multivibrator 26. Thereafter, the multivibrator 45 is reset and if the bad discharges persist, a suppression signal is produced again by the clamp 46 and the power to the gap is again turned off. However, if the short or other condition has cleared, the normal machining will be resumed upon the resetting of the circuit 45. A detailed description of this power supply and the pulse quality testing and fast acting safety circuitry is found in co-pending U.S. patent application S.N. 599,140 assigned to the assignee of the present invention.

The apparatus discussed thus far has shortcomings in that no means for determining efficiency of machining operations is available. Previously, the operators would have to depend on sound, voltmeters and ammeters to obtain optimum machining performance. Such a determination required a great amount of skill on the part of the operator. It is the purpose of this invention to reduce the skill required of the operator by providing him with a direct readout of the efficiency of the machining pulses in the gap.

Figure 2:
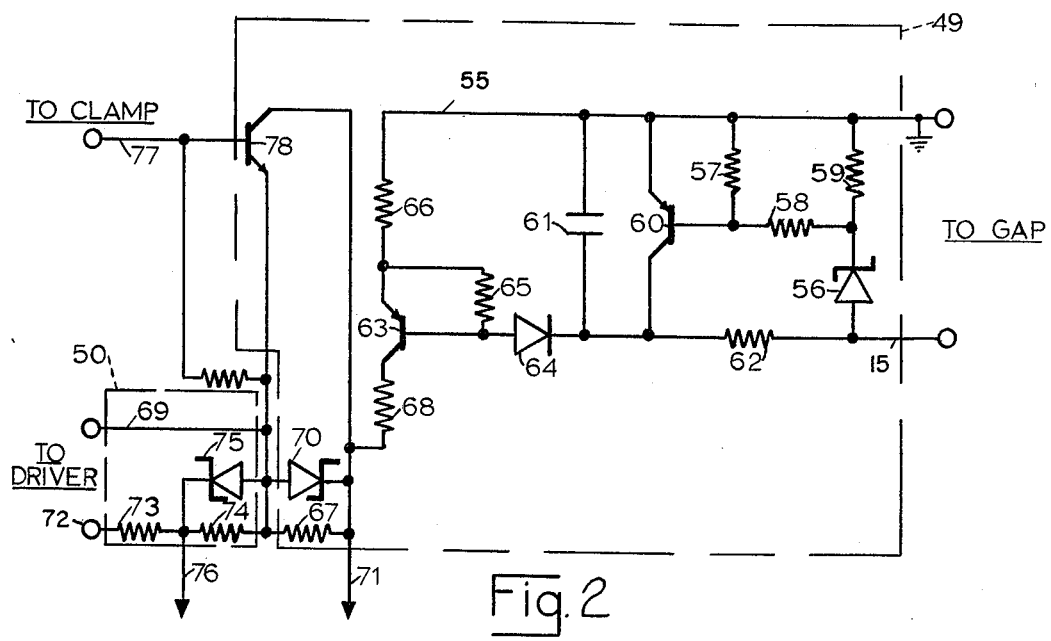
FIG. 2 is a detailed schematic wiring diagram of a portion of the circuit of FIG. 1.
Figure 4:
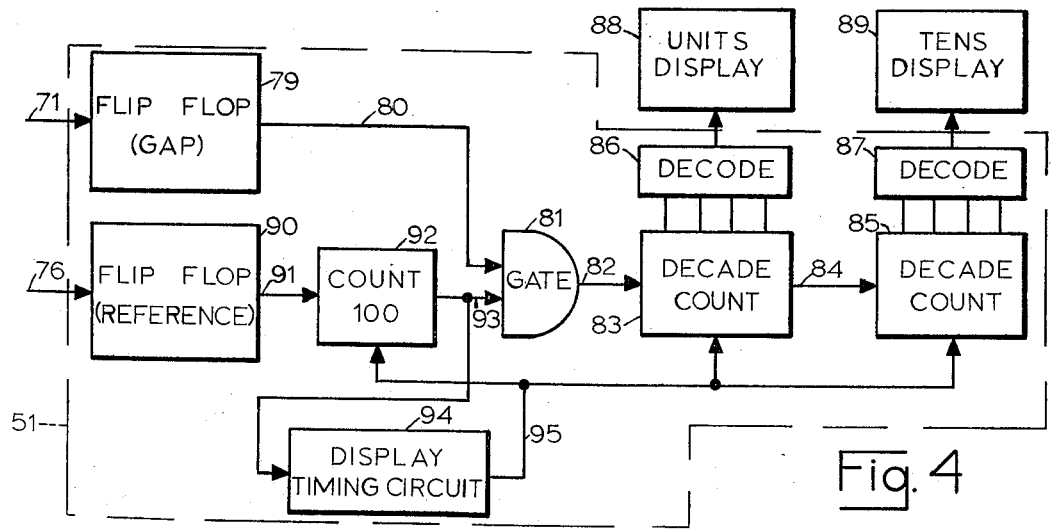
FIG. 4 is a detailed block diagram showing a portion of the electrical control circuitry in FIG. 1 and is specifically that portion of the circuitry which provides the readout of gap efficiency after comparison of the number of good discharges to a predetermined number of input power pulses.

The circuitry which provides the means for determining spark efficiency as a direct percentage readout includes a spark interface circuit 49, a reference interface circuit 50, and a comparator circuit 51 together with a readout panel 52, the details of these being shown in FIGS. 2 and 4. It is the purpose of this unique control circuitry to detect good sparks or discharges and to compare these quantitatively with the actual spark commands from the machining power supply. The ratio of good sparks to commanded discharges is displayed directly as a percentage reading.

The spark interface 49 receives as its input the power pulse output on line 15 that connects with the tool 12. The potential signal from the line 15 to the gap common or ground connection, FIG. 1, indicates the voltage across the machining gap. Low level peaks indicate shorting and low efficiency arcs that will not produce metal removal. Short duration, but higher voltage signals indicate prematurely terminated pulses that likewise do very little or no work. These pulses that produce very little or no useful machining work are characterized as bad pulses. The spark interface 49 is comprised of a discriminating circuit which distinguishes the good pulses from the bad pulses and for each good pulse the circuit 49 produces an output that is input to the comparator circuit 51.

The reference interface circuit 50 receives as an input a spark command signal from the driver circuit 30 and outputs a signal directly to the comparator circuit 51. The ratio per unit of time of the outputs of the two interfaces 49, 50 is converted into a percentage figure in the comparator circuit 51 and this is displayed for the operator's convenience directly as a readout 52 on the control panel by means of Nixie tubes or other equivalent devices. The percentage figure provides the operator with a very meaningful bit of data and enables him to make appropriate adjustments in the controlled parameters of the system to immediately improve the system operation and machining results.

Figure 3:
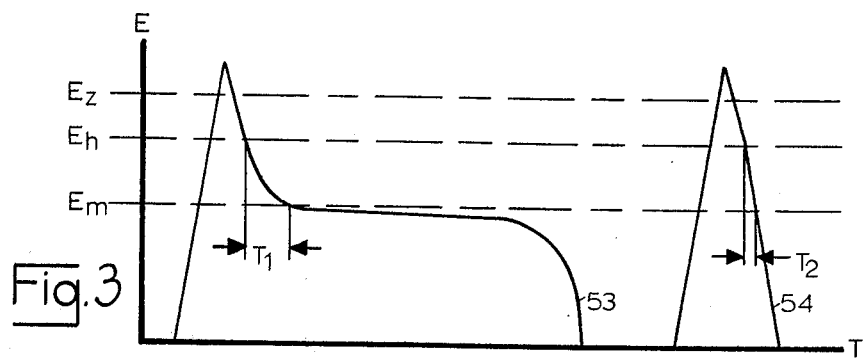
FIG. 3 is a plot of the gap voltage signal showing two wave forms, one being a good machining pulse form and the other being a bad or unacceptable pulse form.

In FIG. 3 there is shown a typical good machining pulse voltage wave form 53. The wave form is shown with potential difference magnitude E plotted against a time base T. The wave shape 53 is characterized by a steep front when the power supply outputs power for a machining pulse. This front rises until the dielectric and the gap ionizes at which time the gap voltage or potential begins to decrease and current begins to flow. This voltage fall is rather sharp but soon levels off to a rather constant plateau over which high current is transmitted across the gap, and this high current performs the useful work desired. When the power supply pulse ends, the gap voltage falls to zero level and awaits the next power or machining pulse input. The time for a pulse of this kind to occur is very short, often only a few microseconds in time span.

If the gap is shorted when the machining pulse occurs, the voltage across the gap will not rise much above the low or zero level and this will give an unambiguous indication of a bad machining pulse. However, the gap may also short during a pulse to cause a premature termination of the useful work. The wave form of such a bad pulse as this is shown by the plot 54. The same steep front occurs and the gap then begins to ionize and voltage begins its steep descent, but due to a shorting condition, falls immediately back to zero level. No useful work could be performed by such a pulse and it should also be characterized as a bad pulse. Since the voltage initially rose to the high level characteristic of a good pulse beginning, the signal at the gap is ambiguous in its initial appearance and it is desirable to distinguish these wave forms 54 from the good pulse form 53.

The interface circuit 49 shown in detail in FIG. 2 discriminates between the good pulse form 53, FIG. 3, and either the bad pulse form 54 or the bad pulse in which no appreciable voltage rise occurs at the beginning of the commanded pulse. The input to the interface 49 is taken from across the power output line 15 and a line 55 that connects with the same ground or common point as the line 14 in FIG. 1. A transistor bias network comprised of a Zener diode 56 and resistors 57, 58 and 59 is connected across the lines 15 and 55 and is in circuit with a transistor 60. The transistor 60 is reverse biased until such time as the voltage across the machining gap rises to a level equal to or above the potential needed to cause the diode 56 to conduct. This is the potential level $E_z$ shown in FIG. 3. The transistor 60 continues to conduct until the gap voltage falls to some level below the level $E_z$ due to hysteresis in the diode 56. This level is indicated by the level $E_h$ and the potential across the transistor begins to increase until it ceases to conduct. A capacitor 61 is connected across the transistor 60 and as the resistance of the transistor increases while it is decreasing conduction, the capacitor 61 is charging. The time required for this charging is determined by the time constant of the R–C circuit including the resistance 62 and is designed to provide a brief delay period after the transistor 60 ceases conduction until the charge across the capacitor 61 is sufficient to provide a forward bias on a second transistor 63 through a protective diode 64 and across a divider network including resistances 65 and 66. This forward bias potential is indicated as the level $E_m$ of FIG. 3 and corresponds to the plateau voltage at which useful machining occurs.

The delay provided by the capacitor 61 is to provide a predetermined time period between the switching off of the transistor 60 and the switching on or conduction of the transistor 63. This period is indicated by the time $T_1$ of FIG. 3. If, for some reason, the gap voltage significantly falls below the level $E_m$ before the transistor 63 is switched on, the capacitor 61 will not charge fully and the transistor 63 will not conduct. The bad pulse form 54 requires only the brief time $T_2$ for the gap voltage to drop below the level $E_m$ and the time $T_2$ is much shorter than the time $T_1$. Therefore, the transistor 63 will not conduct when the gap potential follows the wave form 54. In this manner the circuit discriminates between the good and bad pulse wave forms 53 and 54. Of course, if the level of the gap signal does not reach any significant level, neither of the transistors 60 and 63 will switch on.

When the transistor 63 conducts, a voltage is developed across a resistance 67 in a series circuit with the transistor 63 and resistances 66 and 68 connected between the power negative bus line 69 and the signal line 15. A Zener diode 70 in parallel with the resistance 67 clips the voltage thereacross at a predetermined level acceptable for inputting over a line 71 to the comparator circuit 51. The signal across the resistance 67 will be in the form of a train of squared pulses of predetermined amplitude and each corresponding in time with a good machining pulse.

The pulse command signal to the reference interface 50 is applied over a line 72 from the power supply driver stage 30 (FIG. 1). The signal is developed across a series voltage divider including resistances 73 and 74. A Zener diode 75 is in parallel with the resistance 74 to clip the signal thereacross at a predetermined level and thus to provide a uniform pulse signal on the line 76 that is connected with the comparator circuit 51. The pulses on the line 76 will occur at regular time intervals corresponding with the output of the multivibrator 26 and the power output from the power supply to the machining gap.

In order to prevent any influence on the efficiency value displayed by the system during the time in which the power output to the gap is inhibited temporarily by the clamp circuit 46 described in the previously cited copending application S.N. 599,140, the output of the clamp circuit 46 is applied over a line 77 and this signal will bias a transistor 78 in the forward direction whenever the output of the clipper stage 28 is inhibited. When the transistor 78 is forward biased, it conducts and clamps input line 71 at or near the potential of the power supply line 69 to inhibit the introduction of good pulse feedback signals.

The circuit of the comparator 51 is shown in block form in FIG. 4. The various blocks included are each comprised of standard digital control circuits and therefore are not shown in detail. The input of good pulse feedback signals on the line 71 is applied to a flip-flop circuit 79, the output of which is a series of pulses transmitted over a line 80 and through a gate circuit 81 to a line 82 that is the input connections of a decade counter 83. For each count of ten bits or pulses in the counter 83, a bit is output over a line 84 and applied to a second decade counter 85. The counters 83 and 85 each have a decoding network 86, 87, respectively, associated therewith and these networks serve to control Nixie tube displays 88 and 89 in the readout unit 52. These two displays are for the units and tens decimal places in accordance with the instantaneous count in the decade counters.

In order for the display to be related as a percentage of machining power pulse efficiency, the reference pulses on line 76 are applied as an input to a flip-flop 90 and the output pulses from this circuit are transmitted over a line 91 to a count by one hundred circuit 92. For each one hundred reference pulses, an output is produced by the counter 92 on line 93 and this output inhibits the gate 81 and thus prevents further entry of pulses to the counter 83. Therefore, the count recorded by the decade counters 83 and 85 is a direct percentage of good pulses occurring for a predetermined number of machining pulse commands, and the units and tens displays will give a visual indication of this as an efficiency reading.

At the same time that the gate 81 is inhibited, a signal is also carried by the output line 93 to an electronic timing control circuit 94 to start a predetermined time delay cycle. The circuit 94 times out after this delay and outputs a reset signal on a line 95. The line 95 connects with the reference pulse counter 92 and the gap pulse counters 83 and 85 and when the reset signal occurs, these are all simultaneously reset to zero to begin a new counting cycle. The time delay cycle is chosen in duration to permit a sufficient dwell of the efficiency display to provide the machine operator time to see it, for example, five seconds. Between each viewing period, the efficiency display is up-dated; this up-dating taking very little time since the machining pulses each occur in a few microseconds and the pulses are separated by only a very few microseconds.

The system described provides a very convenient direct readout of gap pulse efficiency with a minimum of additional circuitry to a standard electrical machining power supply. It directly provides the operator with information that he previously had to extrapolate from other factors and thus reduces the skill required of the machine operator.

I claim:

1. In an electrical machining apparatus for removing material from a conductive workpiece by spark discharges across a machining gap between the workpiece and a tool electrode, the apparatus including a power supply having an output of high frequency direct current pulses applied across the machining gap, a process efficiency detection circuit comprising in combination:
    (a) a detection and quality testing circuit connected to the machining gap and operable to produce a good pulse output signal for each effective machining spark,
    (b) an interface circuit connected to the power supply and operable to produce a series of reference pulse outputs corresponding to the direct current pulses applied across the machining gap,
    (c) means for comparing the number of good pulse signals with a predetermined quantity of concurrently produced reference pulses and for providing the ratio thereof as an electrically represented percentage signal, and
    (d) means for utilizing said percentage signal for indicating process efficiency.

2. The apparatus of claim 1 wherein:
    (a) said means for utilizing said percentage signal is of the type displaying a visual representation corresponding thereto.

3. The apparatus of claim 1 wherein the detection and quality testing circuit includes:
    (a) one portion sensitive to ionization of the machining gap, and
    (b) another portion sensitive to the time duration of ionization whereby preset standards for both ionization and time duration thereof must be exceeded prior to production of the good pulse output signal.

4. The apparatus of claim 3 wherein:
   (a) said one portion of the quality testing circuit is sensitive to the electrical potential rise across the machining gap upon the occurrence of power pulses from the power supply to detect ionization thereof.

5. The apparatus of claim 1 wherein the means for comparing includes:
   (a) a good pulse counter,
   (b) a reference pulse counter, and
   (c) means for relating the count ratio in said counters as a percentage value of good pulses over a predetermined series of reference pulses.

6. The apparatus of claim 5 wherein:
   (a) the reference pulse counter counts through a cycle of one hundred reference pulses and produces an output inhibit signal,
   (b) said means for relating is an input gate circuit and the good pulse signals are transmitted therethrough to said good pulse counter, said inhibit signal applied to said gate to prevent transmission of good pulse signals therethrough after a reference pulse count of one hundred whereby the count of good pulse signals in said good pulse counter is a direct representation of the good pulse percentage value, and
   (c) means is provided for resetting said good pulse and reference counters to restart the counting cycle.

7. The apparatus of claim 6 wherein:
   (a) said means for resetting is a delay circuit operable upon receipt of the inhibit signal to output a reset signal after a predetermined period thereby allowing said percentage to be held for the predetermined period for use and thereafter to be up-dated following restart of said counters, and
   (b) means are provided for applying the inhibit signal to said time delay circuit and the reset signal to said counters.

8. The apparatus of claim 6 wherein:
   (a) a display circuit is connected to said good pulse counter and is operable to translate the count therein into a visual representation thereof.

References Cited

UNITED STATES PATENTS

| | | |
|---|---|---|
| 3,340,478 | 9/1967 | Poerschke. |
| 3,349,217 | 10/1967 | Helms et al. _____ 219—109 X |
| 3,381,107 | 4/1968 | Poerschkle. |

JOSEPH V. TRUHE, Primary Examiner

R. F. STAUBLY, Assistant Examiner

U.S. Cl. X.R.

219—109, 135